(12) United States Patent
Capulli et al.

(10) Patent No.: US 10,951,014 B2
(45) Date of Patent: Mar. 16, 2021

(54) RETENTION DEVICE FOR FLEXIBLE CABLES

(71) Applicant: ENCABLIST S.r.l., Ancona (IT)

(72) Inventors: Edoardo Capulli, Ancona (IT); Emma Capulli, Ancona (IT); Andrea Dini, Ancona (IT)

(73) Assignee: ENCABLIST S.r.l., Ancona (IT)

( * ) Notice: Subject to any disclaimer, the term of this patent is extended or adjusted under 35 U.S.C. 154(b) by 39 days.

(21) Appl. No.: 16/331,274

(22) PCT Filed: Sep. 7, 2017

(86) PCT No.: PCT/EP2017/072512
§ 371 (c)(1),
(2) Date: Mar. 7, 2019

(87) PCT Pub. No.: WO2018/046620
PCT Pub. Date: Mar. 15, 2018

(65) Prior Publication Data
US 2019/0356118 A1    Nov. 21, 2019

(30) Foreign Application Priority Data

Sep. 12, 2016   (IT) .................... 102016000091756

(51) Int. Cl.
*H02G 3/00* (2006.01)
*H02G 3/04* (2006.01)
*H02G 11/00* (2006.01)

(52) U.S. Cl.
CPC ........... *H02G 3/0418* (2013.01); *H02G 3/045* (2013.01); *H02G 11/00* (2013.01)

(58) Field of Classification Search
CPC .. H02G 7/05; H02G 7/06; H02G 7/08; H02G 7/10
(Continued)

(56) References Cited

U.S. PATENT DOCUMENTS 2,896,887 A * 7/1959 Beltz ................. F16L 3/223
248/49
3,861,015 A * 1/1975 Hooven .................. F16L 3/23
29/755

(Continued)

FOREIGN PATENT DOCUMENTS

DE   20 2015 006038 U1   12/2012
EP       0 893 865 A2     1/1999
(Continued)

*Primary Examiner* — Steven M Marsh

(57) ABSTRACT

A retention device (100) for a flexible cable (F) comprises: a perimeter wall (2) that defines an axial cavity (1) intended to house the flexible cable (F); two axial openings (11) disposed at the ends of the perimeter wall (2) and in communication with the axial cavity (1); at least two radial openings (12, 13) obtained in the perimeter wall (2) and in communication with the axial cavity (1); a slot (14) obtained in said perimeter wall (2) and disposed between said two radial openings (12, 13), in such a way that the flexible cable (F) can be inserted in the radial openings (12, 13) and in the slot (14), in a zigzag configuration; first, second and third fastening/unfastening means (3) disposed in said perimeter wall (2) to fasten/unfasten the device (100) to other devices (100); the fastening/unfastening means (3) being angularly spaced, in such a way that a device (100) can be fastened to three devices (100) according to different mounting configurations.

12 Claims, 5 Drawing Sheets

(58) Field of Classification Search
USPC .......................... 248/73, 65, 74.2, 68.1, 67.7
See application file for complete search history.

(56) References Cited

U.S. PATENT DOCUMENTS

| | | | |
|---|---|---|---|
| 8,242,367 B2 * | 8/2012 | Guthke | ................ H02G 3/0456 |
| | | | 174/72 A |
| 8,485,479 B2 * | 7/2013 | Chiu | ........................ H02G 3/32 |
| | | | 248/73 |
| 10,214,160 B2 * | 2/2019 | Mizuno | .................... H02G 3/38 |
| 10,439,381 B1 * | 10/2019 | Mohlman | ............ H02G 3/0406 |
| 2012/0121120 A1 | 5/2012 | Gorzelany | |
| 2016/0254076 A1 | 9/2016 | Kulas | |

FOREIGN PATENT DOCUMENTS

| | | |
|---|---|---|
| EP | 1 220 398 A2 | 3/2002 |
| FR | 2 242 795 A1 | 3/1975 |
| FR | 2 990 049 A3 | 1/2013 |
| JP | 2008 005608 A | 1/2008 |
| WO | WO 01/08280 A2 | 1/2001 |
| WO | WO 2005/022560 A1 | 3/2005 |
| WO | WO 2013/020340 A1 | 2/2013 |

\* cited by examiner

RETENTION DEVICE FOR FLEXIBLE CABLES

CROSS REFERENCE TO RELATED APPLICATIONS

This application is a 371 National Stage Entry of PCT/EP2017/072512 filed Sep. 7, 2017, and PCT/EP2017/072512 claims priority to Italian Application 102016000091756, filed Sep. 12, 2016. The contents of Italian Application 102016000091756, filed Sep. 12, 2016, are incorporated by reference in its entirety.

The present patent application for industrial invention relates to a retention device for flexible cables, such as for example electrical cables of household appliances and electronic devices.

As it is known, household appliances and electronic devices are provided with electrical cables for connecting the device to the electrical mains or to another device. Said electrical cables are generally long and cumbersome.

The most typical and annoying drawbacks of said cables are:

the cables can get entangled, creating a tangle and making it difficult to identify the single cable, the cables occupy a large part of the desk, it is impossible to connect multiple cables to only one inlet (i.e. two or more USB devices to be alternately connected to only one inlet), the cables cannot be easily separated or joined for cleaning the working space.

Retention devices of a flexible cable are known, but none of them is able of simultaneously solving all the aforementioned problems. Said devices comprise a cavity intended to house and hold the cable after bending it in multiple sections. Said devices have fastening means for being fastened together. However, the fastening means are disposed in a given position of the device. Therefore, said devices are not versatile and do not permit to have different mounting configurations.

Moreover, the fastening means interfere with the housing that contains the cable, thus considerably reducing the space of said housing. Consequently, the housing of the cable needs to be overdimensioned, to the detriment of the total volume of the device.

The purpose of the present invention is to remedy the drawbacks of the prior art, by disclosing a device that fastens and retains the flexible cable in a practical, easy, rapid and effective way.

Another purpose is to provide such a device that is aesthetically pleasant and allows for fastening the flexible cable to a support.

The device of the invention comprises:

a perimeter wall that defines an axial cavity intended to house a flexible cable;

two axial openings disposed at the ends of said perimeter wall and in communication with said axial cavity;

at least two radial openings obtained in said perimeter wall and in communication with said axial cavity; said two radial openings comprising a first radial opening and a second radial opening in opposite position;

a slot obtained in said perimeter wall and disposed between said two radial openings in such a way that the cable can be inserted in the radial openings and in the slot in zigzag configuration;

first fastening/unfastening means disposed in said perimeter wall to fasten/unfasten the device with an identical device.

The peculiarity of the device according to the invention consists in that it also comprises:

second fastening/unfastening means disposed in said perimeter wall and angularly spaced from said first fastening/unfastening means, and third fastening/unfastening means disposed in said perimeter wall and angularly spaced from said first fastening/unfastening means and from said second fastening/unfastening means.

The advantages of the device according to the present invention are evident, wherein the provision of three fastening/unfastening means, which are angularly spaced, makes it possible to fasten the device to three electronic devices according to different mounting configurations.

For the sake of clarity, the description of the device according to the invention continues with reference to the attached drawings, which have a merely illustrative, not limiting value, wherein.

Figure 1:
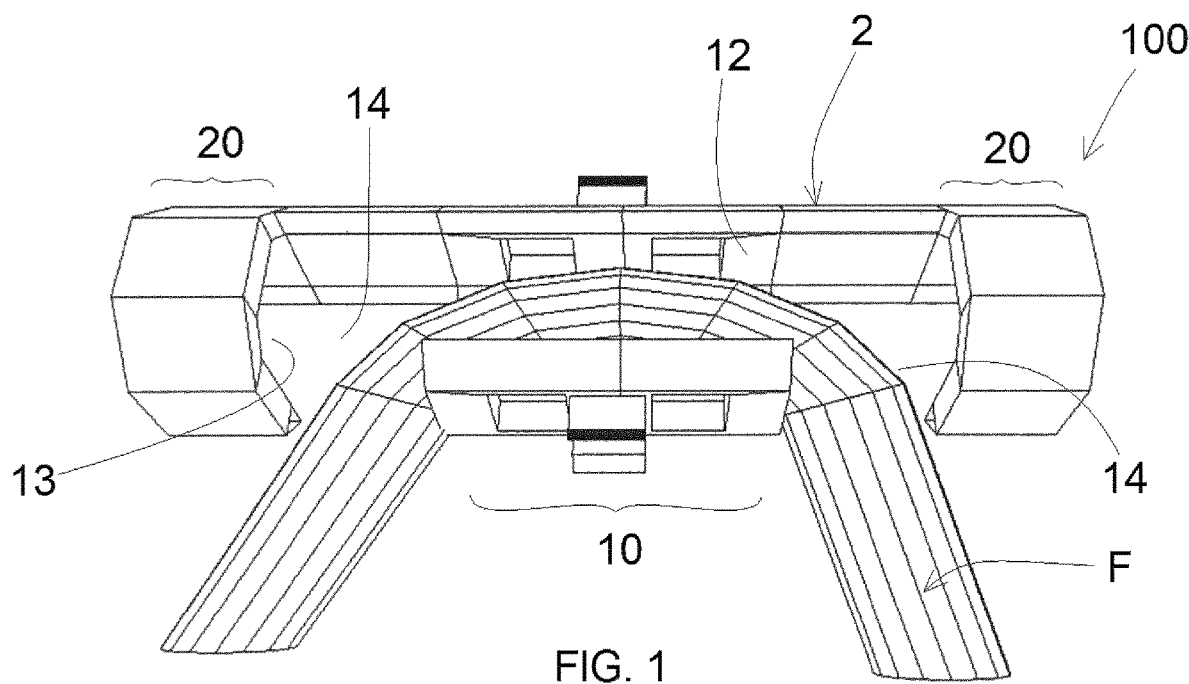
FIG. 1 is an axonometric view of the device according to the invention, in a retention step of a cable.

With reference to FIG. 1, a device according to the invention is disclosed, which is generally indicated with reference numeral 100.

The device (100) is intended to house a portion of a flexible cable (F).

The flexible cable (F) can have a different thickness according to the use. For example, flexible cables (F) with a small diameter (lower than or equal to 2.4 mm) are used for earphones or battery chargers, whereas flexible cables (F) with a large diameter (higher than 2.4 mm) are used for connecting electronic devices or household appliances. Advantageously, the flexible cable (F) comprises an external coating made of rubber material.

Figure 2:
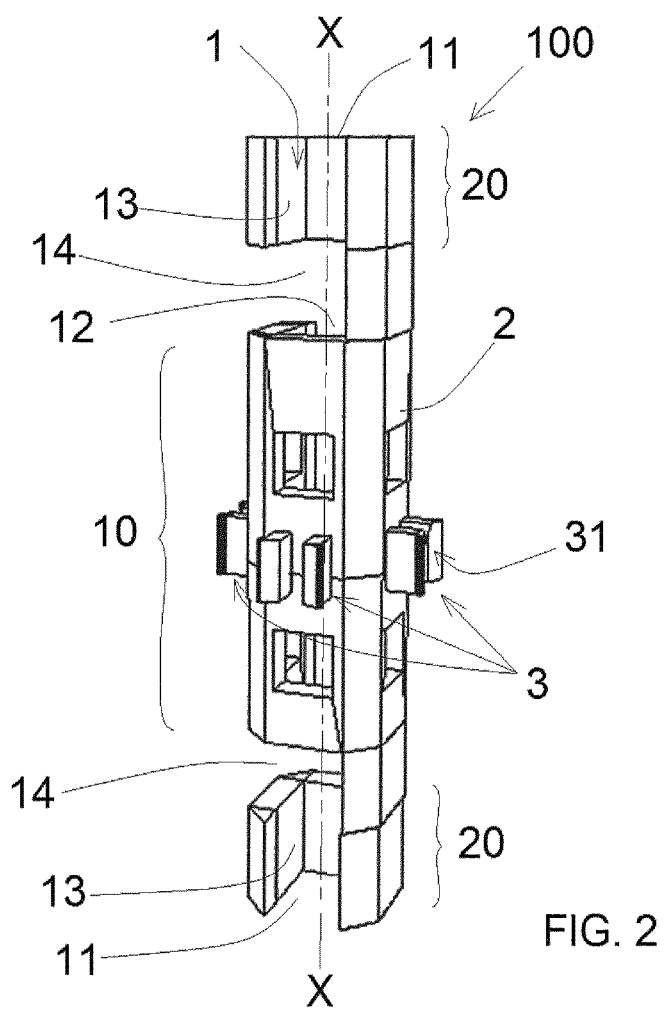
FIG. 2 is an axonometric view of the device of FIG. 1, without cable.
Figure 3:
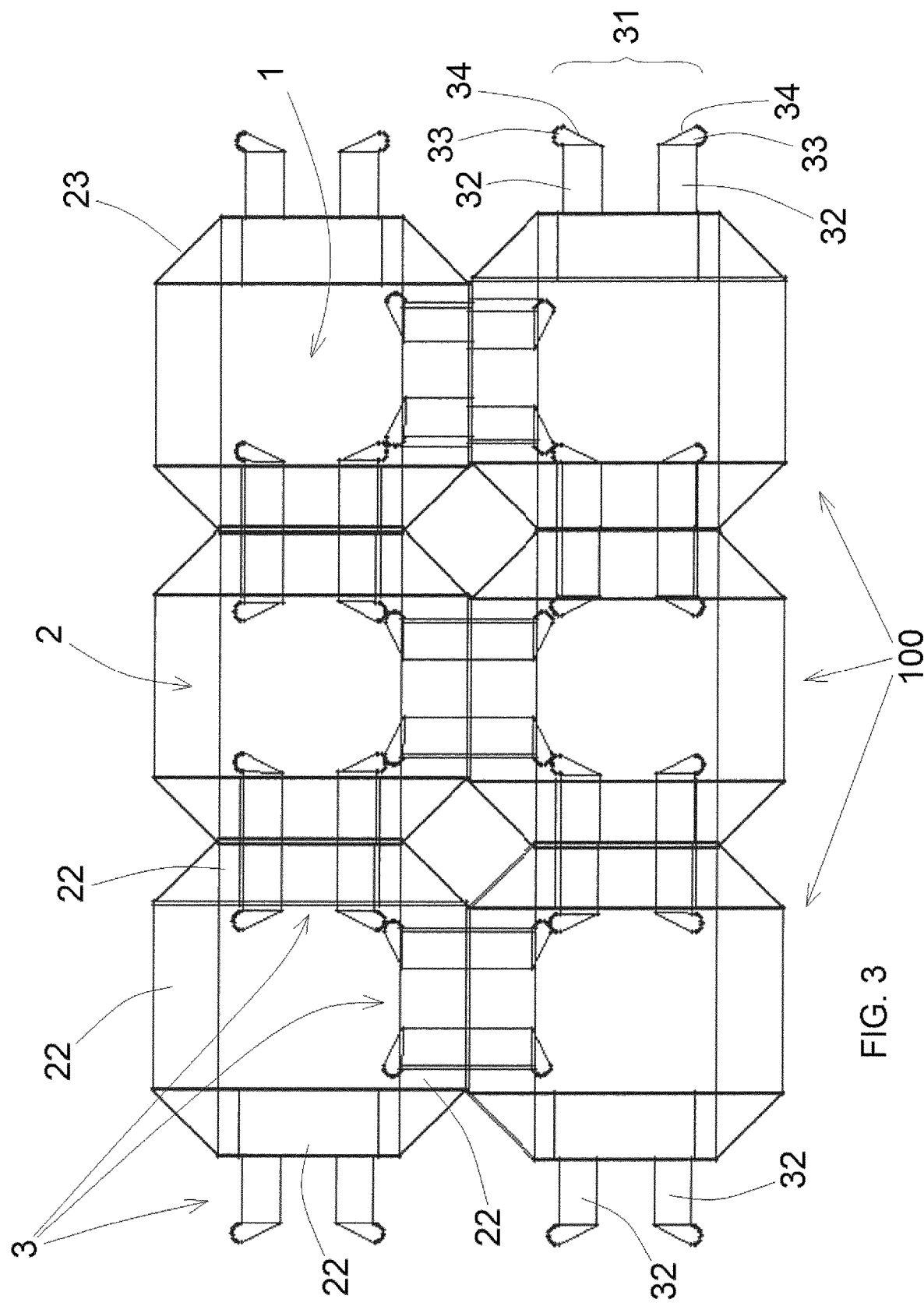
FIG. 3 is a diagrammatic top view of six devices according to the invention, fastened together.

With reference to FIGS. 2 and 3, the device (100) has a polyhedral elongated shape, with a polygonal section, such as for example an octagon. Alternatively, the device (100) can have a rectangular, pentagonal, hexagonal or triangular section, or a cylindrical shape with circular section.

The device (100) has a longitudinal axis (X). When the flexible cable (F) is housed straight in the device (100), the longitudinal axis of the flexible cable (F) is parallel to the longitudinal axis (X) of the device.

The device (100) comprises a perimeter wall (2) that defines an axial cavity (1) intended to house the flexible cable (F);

The perimeter wall (2) comprises at least four sides (22). Each side (22) has a thickness of approximately 1-2 mm. The device (100) comprises two axial openings (11) disposed at the opposite ends of the perimeter wall (2) and in communication with the axial cavity (1); The axial openings (11) are used for inserting the flexible cable (F) inside the axial cavity (1).

With reference to FIGS. 1 and 2, the device (100) comprises at least two radial openings (12, 13) obtained in the perimeter wall (2) of the device (100) and in communication with the axial cavity (1). The radial openings (13) are used for inserting the flexible cable inside the axial cavity (1). Said two radial openings (12, 13) comprise a first radial opening (12) and a second radial opening (13) disposed in diametrally opposite positions.

Figure 5:
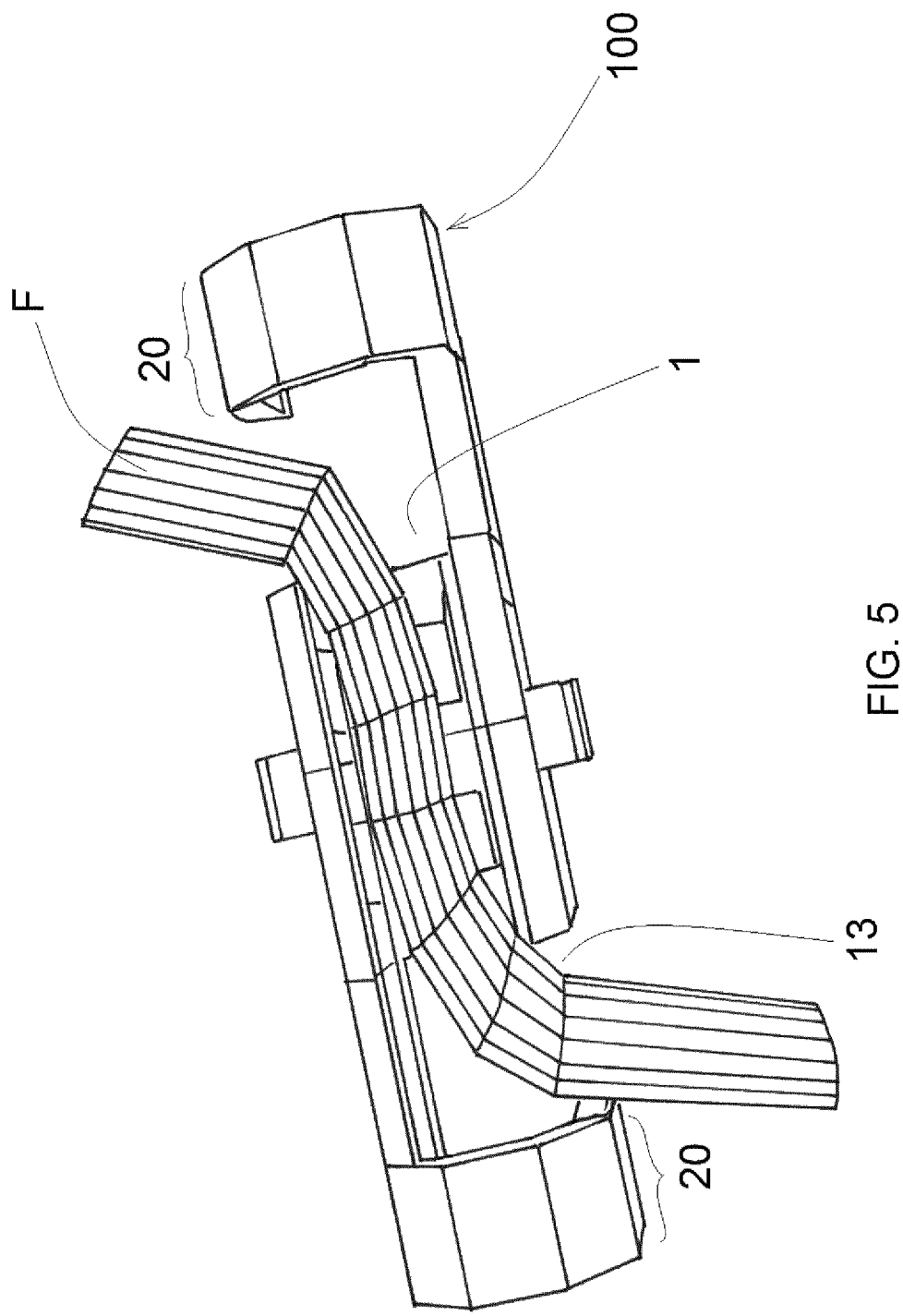
FIG. 5 is an axonometric view of the device of FIG. 1, wherein a flexible cable is inserted in a cavity of the device and has an "S"-bent configuration.

A slot (14) is obtained in the perimeter wall (2), between the two radial openings (12, 13). In view of the above, the flexible cable (F) is inserted in the first radial opening (12), and is then passed through the slot (14) in order to be inserted in the second radial opening (13), in such a way to bend in an "S"-shaped configuration, as shown in FIG. 5.

As shown in FIGS. 1, 2 and 3, the device (100) comprises a central portion (10) of the perimeter wall that defines the first radial opening (12), and at least one end portion (20) of the perimeter wall disposed at one end of the device. The end portion (20) of the perimeter wall defines the second radial opening (13). Preferably, the end portion (20) is flexible in such a way to get deformed for introducing the flexible (F) in the axial cavity (1). The central portion (10) and the end portion (20) have a "C"-shaped cross-section.

The device (100) can comprise two end portions (20) disposed at the ends of the device, as shown in FIG. 2. The two end portions (20) define second radial openings (13) in opposite position to the first radial opening (12) defined by the central portion. In such a case, two slots (14) are provided between the end portions (20) and the central portion. In such a way, the flexible cable (F) can be inserted in the radial openings (12, 13) in a zigzag configuration.

Figure 4:
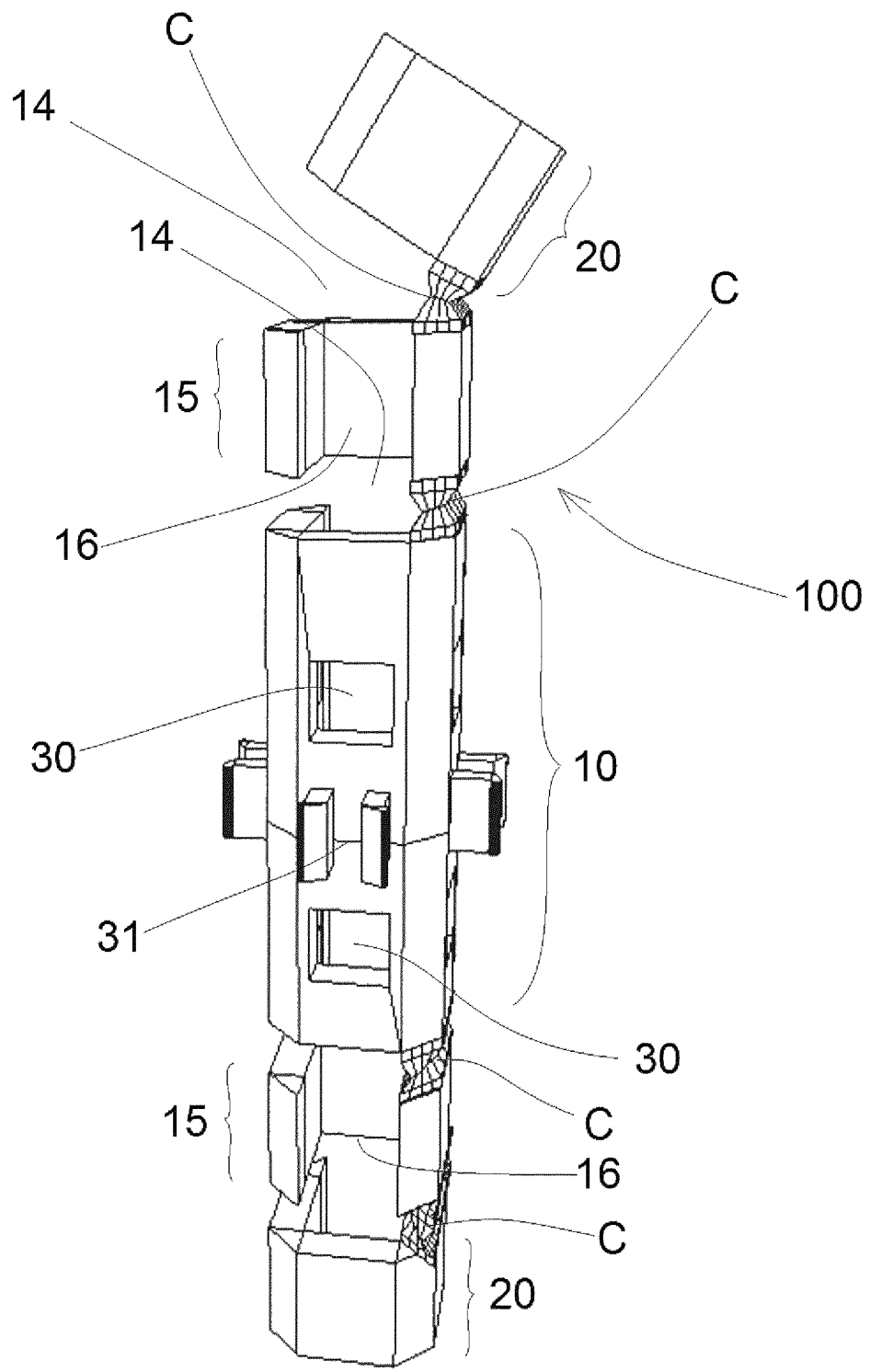
FIG. 4 is an axonometric view of a variant of the device of FIG. 2.

With reference to FIG. 4, one or more intermediate portions (15) of the perimeter wall can be provided between the central portion (10) and each end portion (20). The intermediate portions (15) have a "C"-shaped cross-section and define radial openings (16) for inserting the cable (F). Slots (14) are provided between the central portion and the two intermediate portions and between the two intermediate portions and the end portions. The cable (F) passes through the slots (14) in a zigzag configuration.

The radial openings (16) of the intermediate portions (15) are disposed in opposite position with respect to the radial openings of the adjacent portions. In view of the above, the cable (F) is forced into a zigzag trajectory inside the axial cavity (1), passing through the radial openings (12, 13, 16) and the slots (14) between the various portions (10, 15, 20) of the perimeter wall.

The length of the end portions (20) and of the intermediate portions (15) of the perimeter wall is lower than the length of the central portion (10). In this way, the end portions (20) and the intermediate portions (15) can easily bend elastically for inserting the flexible cable (F).

With reference to FIGS. 2 and 3, the device (100) comprises fastening/unfastening means (3) disposed in the perimeter wall (2) of the device to fasten/unfasten the device (100) with another device (100). So, multiple devices (100) can be joined together to put the flexible cables (F) in order.

Said fastening/unfastening means (3) comprise first fastening/unfastening means, second fastening/unfastening means and third fastening/unfastening means disposed on the perimeter wall (2) in angularly spaced position.

If the perimeter wall has a polygonal perimeter, with at least four sides (22), the fastening/unfastening means are disposed on three sides (22) of the perimeter wall of the device (100).

Each of the first fastening/unfastening means, of the second fastening/unfastening means and of the third fastening/unfastening means is of male-female type. Each of said fastening/unfastening means (3) comprises:
a male element (31) protruding from one of the three sides (22) of the perimeter wall; and
at least one female element (30) consisting in an opening obtained on one of the three sides (22) of the perimeter wall.

Such an opening of the female element (30) is intended to house the male element (31) and, advantageously, has a square shape.

Because of the provision of said fastening/unfastening means (3) that are disposed on three sides (22) of the perimeter wall of the device (100), it is possible to fasten multiple devices (100) together according to the different mounting configurations. In other words, a device (10) can be fastened to three devices (100). So, it is possible to dispose a plurality of devices (100) along the same flexible cable (F), roll the flexible cable (F) and fasten overlapped sections of the flexible cable (F) easily and rapidly by fastening the devices (100) together by means of the fastening/unfastening means (3), regardless of the direction and of the position of the devices (100).

Advantageously, the female elements (30) comprise two openings on each of the three sides (22) of the perimeter wall, and the male element (31) is disposed between the two openings of the female elements (30). In this way, the device can be freely rotated by 180°, without having a preferred fastening direction.

The male element (31) of the fastening/unfastening means (3) comprises two elastic tabs (32) that can be inserted in an opening of the female element (30) of another device (100) in elastic snap mode.

With reference to FIG. 3, each elastic tab (32) comprises a retention tooth (33) with a tapered surface (34).

In this way, when the male element (31) of a device (100) is inserted in one of the openings of the female element (30) of another device, the tapered surfaces (34) of the retention teeth touch the borders of the opening of the female element (30) and elastically bend inwards. When the retention teeth (33) pass beyond the border of the opening, the elastic tabs (32) are elastically snapped outwards and the retention teeth (33) are stopped against the border of the opening, retaining the two devices fastened together.

Advantageously, the perimeter wall (2) defines an octagonal perimeter with four long sides (22) that are joined by means of four short sides (23). In this way, when the elastic tabs (32) are inserted in the opening of the female element (30), the retention teeth (33) of the elastic tabs are stopped against the cable (F) and are elastically bent towards the short side (23) of the perimeter wall, thus using the maximum width possible of the axial cavity (1) to house the cable (F).

With reference to FIG. 4, the intermediate portions (15) of the device (100) are advantageously hinged to the central portion (10) by means of hinges (C). The end portions (20) are hinged to the intermediate portions (15) by means of hinges (C). In this way, the intermediate portions (15) and the end portions (20) can rotate one with respect to the other and with respect to the central portion, favoring the insertion of the cable (F) in the axial cavity (1) of the device.

Figure 6:
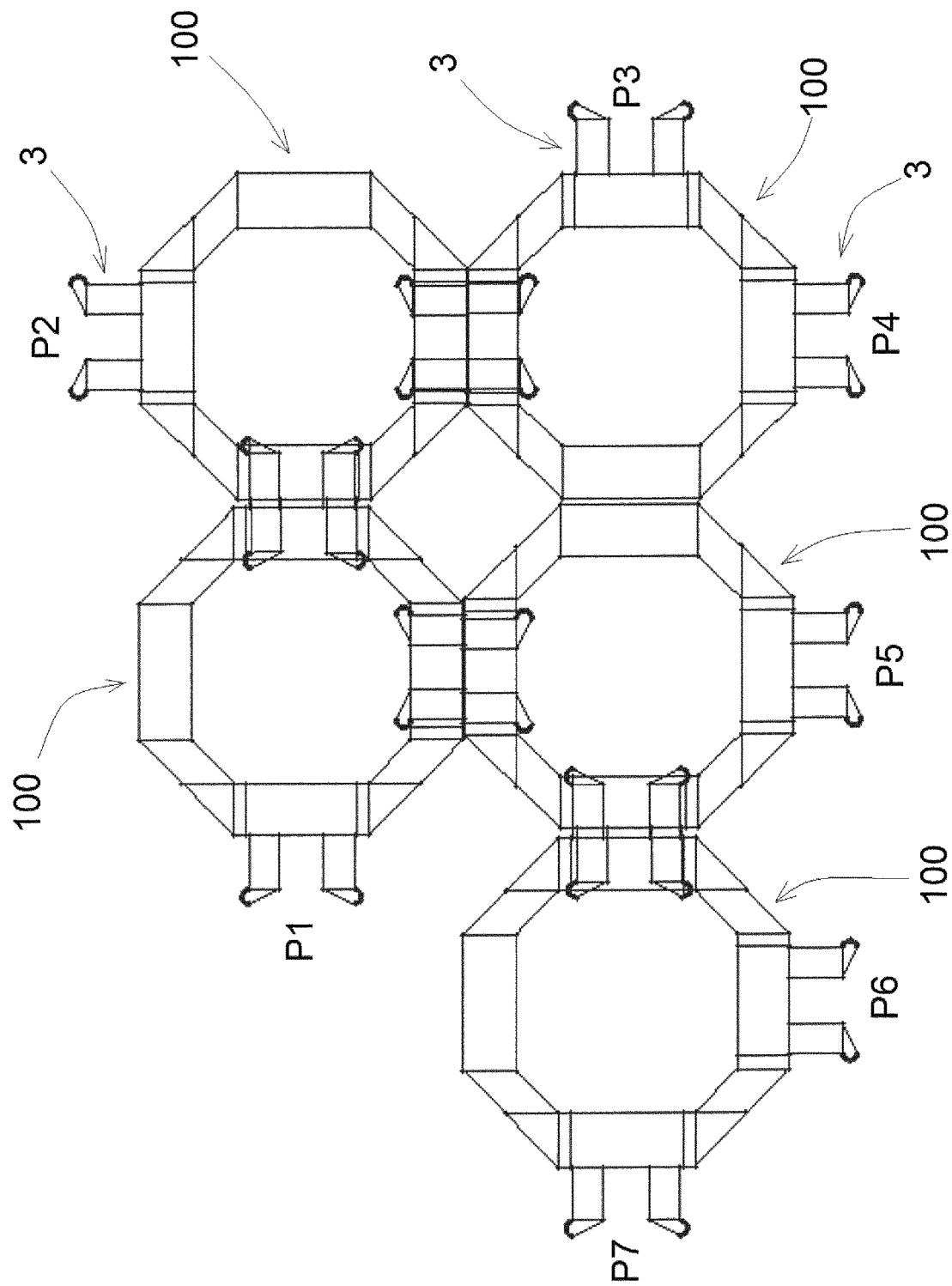
FIG. 6 is a diagrammatic top view of five devices according to the invention, fastened together, with seven additional fastening possibilities in multiple directions.

FIG. 6 shows a composition of five devices (100) that are fastened together. In such a composition seven fastening/unfastening means (3) are free in seven different positions (P1, P2, P3, P4, P5, P6, P7).

The invention claimed is:
1. Retention device (100) for a flexible cable (F); said device (100) having a longitudinal axis (X) and comprising:
a perimeter wall (2) that defines an axial cavity (1) intended to house said flexible cable (F);
two axial openings (11) disposed at the ends of said perimeter wall (2) and in communication with said axial cavity (1);

at least two radial openings (12, 13) in said perimeter wall (2) extending parallel to the longitudinal axis (X) and in communication with said axial cavity (1); said at least two radial openings (12, 13) comprising a first radial opening (12) and at least one second radial opening (13);

a slot (14) obtained in said perimeter wall (2) and disposed between, and connecting each of, said at least two radial openings (12, 13) so as to have a continuous radial opening extending between the two axial openings (11), in such a way that the flexible cable (F) can be inserted in the radial openings (12, 13) and in the slot (14), in a zigzag configuration;

first fastening/unfastening means (3) disposed in said perimeter wall (2) to fasten/unfasten the device (100) with another device (100);

wherein the retention device (100) further comprises:

second fastening/unfastening means (3) disposed in said perimeter wall (2) with an angular spacing in a circumferential direction around the perimeter wall (2) from said first fastening/unfastening means (3), and third fastening/unfastening means (3) disposed in said perimeter wall (2) with an angular spacing in a circumferential direction around the perimeter wall (2) from said first fastening/unfastening means (3), and from said second fastening/unfastening means (3), in such a way that a retention device (100) can be fastened to three retention devices (100) in different mounting configurations, wherein said perimeter wall (2) comprises at least:

a) a central portion (10) placed along said longitudinal axis (X) and defining said first radial opening (12), b) a first and a second end portion (20), respectively placed along said longitudinal axis (X) and opposite each other with respect to the ends of said central portion (10), each of said first and second end portions (20) defining one of said second radial opening (13), characterized in that said central portion (10) and said end portion (20) of said perimeter wall (2) have a "C"-shaped cross-section with the first radial opening (12) of said central portion (10) being rotated by 180° around the longitudinal axis (X) with respect to said second radial openings (13) of the first and second end portions (20).

2. The device (100) of claim 1, wherein each of said first, second and third fastening/unfastening means (3) are of male-female type and comprise:

a male element (31) that projects from the perimeter wall (2); and at least one female element (30) consisting in an opening obtained of an opening in the perimeter wall; said opening of the female element (30) being intended to house the male element.

3. The device (100) of claim 2, wherein the female element (30) of each of said fastening/unfastening means (3) comprises two openings and the male element (31) of each one of said fastening/unfastening means (3) is disposed between the two openings of the female element (30).

4. The device (100) of claim 2, wherein the male element (31) of each one of said fastening/unfastening means (3) comprises two elastic tabs (32) that can be inserted in an opening of the female element (30) of another device (100) in elastic snap mode.

5. The device (100) of claim 4, wherein each elastic tab (32) of each male element (31) comprises a retention tooth (33) with a tapered surface (34).

6. The device (100) of claim 1, wherein said end portions (20) of the perimeter wall (2) are flexible.

7. The device (100) of claim 1, wherein said perimeter wall (2) comprises two end portions (20) disposed at the ends of the perimeter wall, and at least one intermediate portion (15) is disposed between the central portion (10) and at least one of said two end portions (20); wherein slots (14) are provided between the central portion (10) and the intermediate portion (15) and between the intermediate portion (15) and the end portion (20).

8. The device (100) of claim 7, wherein said device (100) comprises hinges D that connect said at least one intermediate portion (15) to the central portion (10) and to the end portion (20), in such a way to rotate the intermediate portion (15) and the end portion (20) one with respect to the other and with respect to the central portion (10).

9. The device (100) of claim 1, wherein said first, second and third fastening/unfastening means (3) are disposed in said central portion (10) of the perimeter wall (2) of the device (100).

10. The device (100) of claim 1, wherein said perimeter wall (2) has a polygonal shape, in cross-section, with at least four sides (22) and said first, second and third fastening/unfastening means (3) are disposed respectively in three sides (22) of said perimeter wall.

11. The device (100) of claim 10, wherein said perimeter wall (2) has an octagonal shape, in cross-section, with at least four long sides (22) and four short sides (23) that join the long sides (22), wherein said first, second and third fastening/unfastening means (3) are disposed respectively in three long sides (22) of said perimeter wall.

12. The device (100) of claim 1 wherein said perimeter wall (2) has an octagonal shape, in cross-section, with at least four long sides (22) and four short sides (23) that join the long sides (22), wherein said first, second and third fastening/unfastening means (3) are disposed respectively in three long sides (22) of said perimeter wall.

\* \* \* \* \*